United States Patent
Sakata

(10) Patent No.: US 9,372,101 B2
(45) Date of Patent: Jun. 21, 2016

(54) TRANSMISSIVE OPTICAL ENCODER HAVING OPTICAL WAVEGUIDE

(71) Applicant: FANUC CORPORATION, Yamanashi (JP)

(72) Inventor: Akinobu Sakata, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 78 days.

(21) Appl. No.: 14/503,667

(22) Filed: Oct. 1, 2014

(65) Prior Publication Data

US 2015/0090867 A1  Apr. 2, 2015

(30) Foreign Application Priority Data

Oct. 2, 2013  (JP) .................................. 2013-207673

(51) Int. Cl.
 G01D 5/34 (2006.01)
 G01D 5/347 (2006.01)
 G01D 5/26 (2006.01)

(52) U.S. Cl.
 CPC .............. *G01D 5/3473* (2013.01); *G01D 5/268* (2013.01); *G01D 5/34707* (2013.01)

(58) Field of Classification Search
 CPC .......... G01D 5/34707; G01D 5/34723; G01D 5/3473
 USPC ............. 250/227.13, 227.14, 227.16, 227.18; 385/8, 12; 341/13, 14
 See application file for complete search history.

(56) References Cited

U.S. PATENT DOCUMENTS 4,931,635 A * 6/1990 Toyama ................. G01D 5/345
                                                                 250/225

FOREIGN PATENT DOCUMENTS

| DE | 3609211 | 9/1987 |
|---|---|---|
| DE | 10242169 | 11/2003 |
| DE | 102006047471 | 4/2008 |
| DE | 102008014720 | 10/2009 |
| EP | 2730894 | 5/2014 |
| JP | 6247915 | 3/1987 |
| JP | 636315 | 1/1988 |
| JP | 63238428 | 10/1988 |
| JP | 05141960 | 6/1993 |
| JP | 08184465 | 7/1996 |
| JP | 2007278927 | 10/2007 |
| JP | 2008020417 | 1/2008 |
| JP | 2008034420 | 2/2008 |
| JP | 2008082958 | 4/2008 |

OTHER PUBLICATIONS

Japanese Office Action mailed Mar. 17, 2013 for Japanese Application No. 2013-207673.
Japanese Office Action mailed Dec. 16, 2014 for Japanese Application No. 2013-207673.

* cited by examiner

*Primary Examiner* — Kevin Pyo
(74) *Attorney, Agent, or Firm* — RatnerPrestia

(57) ABSTRACT

A transmissive optical encoder includes a light emitting element, a light receiving element, a rotatable disk provided with slits and rotatable together with an object of detection, and an optical waveguide having an inlet facing the light emitting element and an outlet facing the light receiving element. The light emitting element and the light receiving element are arranged on the same side in relation to the rotatable disk. The optical waveguide is fixed independently of rotational movement of the rotatable disk.

1 Claim, 3 Drawing Sheets

TRANSMISSIVE OPTICAL ENCODER HAVING OPTICAL WAVEGUIDE

BACKGROUND OF THE INVENTION

1. Field of the Invention

The present invention relates to a transmissive optical encoder.

2. Description of the Related Art

A common type of transmissive optical encoder includes a light emitting element, a light receiving element, and a rotatable disk provided with a number of slits arranged at a predetermined pitch from each other. In the transmissive optical encoder, light emitted from the light emitting element is projected onto the rotatable disk, such that a pattern of light and shadow is generated, resulting from light passing through the slits and light blocked by portions where no slit is formed. The light receiving element detects changes in the pattern of light and shadow as the rotatable disk is rotating. In this way, an angular position and rotational speed of the object, which moves together with the rotatable disk, can be detected.

Some transmissive optical encoders have a configuration in which the light emitting element and the light receiving element are arranged on opposite sides of the rotatable disk and the rotatable disk is situated between the light emitting element and the light receiving element. In this case, due to the light emitting element and the light receiving element as well as their packaging parts, the optical system tends to occupy a larger space.

In order to avoid this disadvantage, a rotatable disk provided with a light emitting element and a light receiving element arranged on the same side in relation to the rotatable disk has been proposed. For example, JP-A-8-184465 discloses an optical encoder which includes a movable plate provided with slits arranged in a circumferential direction at constant gaps therebetween, a light emitting element provided so as to face the movable plate in a first region, a light receiving element provided so as to face the movable element in a second region, and a projection means provided between the first region and the second region on the opposite side of the light emitting element and the light receiving element in relation to the movable element.

JP-A-2008-82958 discloses an optical encoder which includes a rotatable disk formed with a plurality of tracks including slits, light emitting elements oriented to the respective tracks, a light receiving element situated on a rotational axis of the rotatable disk and on the same side as the light emitting element in relation to the rotatable disk, and a rotational optical waveguide disk which is rotated together with the rotatable disk.

JP-A-5-141960 discloses an optical rotational angle detection device which includes an optical fiber serving as an optical waveguide, one end of which is oriented to a light source, and the other end of which is oriented to an optical position sensing element. The optical fiber is supported by a rotatable member coupled to a rotational axis so as to be rotated together with the rotational axis.

However, the optical encoder disclosed in JP-A-8-184465 is configured such that the projection means forms an equal magnification inverting optical system. This complicates the configuration of the optical system, and it is necessary to accurately position the respective elements of the optical system in relation to one another, in order to ensure sufficient detection accuracy. As a result, the manufacturing cost of the encoder is increased. Further, since it is necessary to maintain positional relationships between the respective elements of the optical system, the usage of the encoder is necessarily limited.

The optical encoders disclosed in JP-A-2008-82958 and JP-A-5-141960 are configured such that the optical waveguide for optically coupling the light emitting element to the light receiving element is moved together with the mechanically rotating part. In particular, when the encoder is used in order to detect movement of the electric motor used for industrial machinery, relatively greater mechanical oscillation is generated due to the electric motor operating at high speed. The oscillation may be transmitted to the optical waveguide via the coupling part. As a result, a gap between the optical waveguide and the light receiving element may change, resulting in impairing the detection accuracy of the encoder.

Accordingly, there is a need for a transmissive optical encoder which can be miniaturized without impairing detection accuracy.

SUMMARY OF THE INVENTION

According to a first aspect of the present invention, a transmissive optical encoder comprising: a light emitting element; a light receiving element; a rotatable disk provided with slits and rotatable together with an object of detection; and an optical waveguide having an inlet facing the light emitting element and an outlet facing the light receiving element, wherein the light emitting element and the light receiving element are arranged on the same side in relation to the rotatable disk, and wherein the optical waveguide is fixed independently of rotational movement of the rotatable disk, is provided.

According to a second aspect of the present invention, in the transmissive optical encoder according to the first aspect, the optical waveguide is configured such that incident light to the optical waveguide is subject to total reflection.

According to a third aspect of the present invention, in the transmissive optical encoder according to the first aspect, the optical waveguide has an internal structure formed from a mirror face such that incident light to the optical waveguide is subject to mirror reflection.

According to a fourth aspect of the present invention, the transmissive optical encoder according to any one of the first to third aspects further comprises an optical element arranged at the inlet and/or the outlet of the optical waveguide and configured to change a direction of light passing therethrough.

According to a fifth aspect of the present invention, in the transmissive optical encoder according to any one of the first to fourth aspects, the optical waveguide has an enlarged portion arranged at the inlet and/or the outlet thereof, such that sectional area of the optical waveguide gradually increases at the enlarged portion.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described below with reference to the accompanying drawings. Constituent elements of the illustrated embodiments may be modified in size in relation to one another for better understanding of the present invention.

Figure 1:
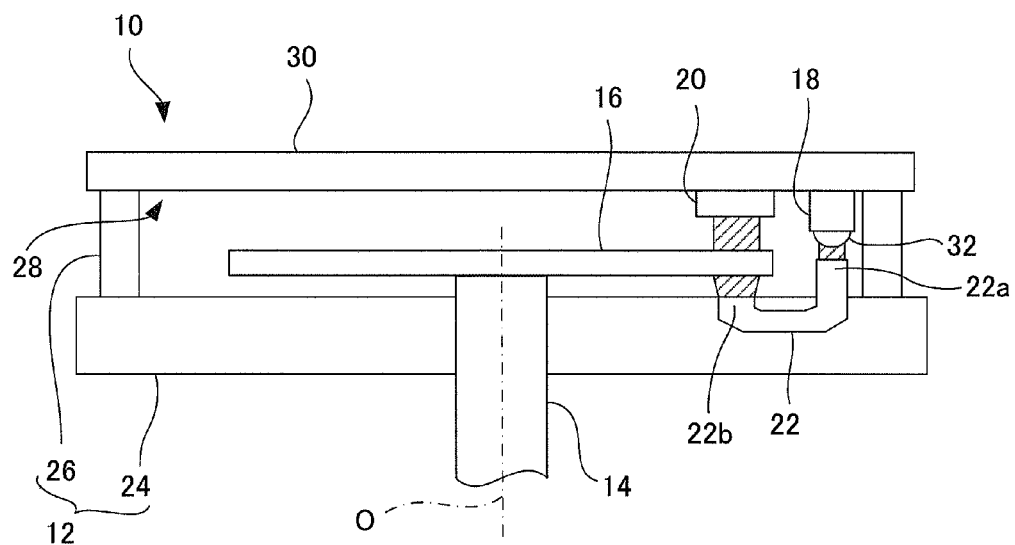
FIG. 1 shows an optical encoder according to a first embodiment of the present invention.

FIG. 1 shows an optical encoder 10 according to a first embodiment of the present invention. A transmissive optical encoder (hereinafter simply referred to as "the encoder") 10 includes a housing 12, a rotational axis 14 rotatable around a rotational axis line O, a rotatable disk 16 rotatable together with the rotational axis 14, a light emitting element 18, a light receiving element 20, and an optical waveguide 22.

The housing 12 of the encoder 10 has a first housing part 24 extending substantially parallel to the rotatable disk 16, and a second housing part 26 extending perpendicularly to the first housing part 24 and defining a surrounding wall of the housing 12. The housing 12 is provided with an opening 28 on a face opposite to the first housing part 24. The opening 28 of the housing 12 is covered by a printed circuit board 30 on which the light emitting element 18 and the light receiving element 20 are mounted.

The rotational axis 14 is coupled to a rotatable element, which is not shown, and is rotated around the rotational axis line O together with the rotatable element. The rotatable element is an object of detection, which is to be detected by the encoder 10 with respect to information on the rotational movement, such as an angular position and rotational speed. The rotatable element may be, for example, an electric motor for converting electric power supplied thereto to rotational mechanical power. One end of the rotational axis 14 is coupled to the rotatable disk 16. The rotatable disk 16 is a circular disk-like member provided with a plurality of slits (not shown) spaced apart from each other in a circumferential direction. Thus, the rotatable disk 16 is designed to be rotated together with the rotatable element and the rotational axis 14.

The light emitting element 18 is a light emitting element having a known configuration, such as light emitting diode or laser diode. According to one embodiment, the light emitting element 18 may have a lens 32 for converting light emitted from the light emitting element 18 into generally parallel light. The light emitted from the light emitting element 18 is projected onto the rotatable disk 16 through the optical waveguide 22 as described below.

The optical waveguide 22 serves to optically couple between the light emitting element 18 and the light receiving element 20 through the inside of the first housing part 24. The optical waveguide 22 may be formed from a plastic optical waveguide, such as polycarbonate or acryl, or an optical fiber, or the like. The optical waveguide 22 has an inlet 22a at one end and an outlet 22b at the other end. The optical waveguide 22 is fixed by the first housing part 24 so as to have a U-shaped form. As illustrated, the inlet 22a of the optical waveguide 22 is oriented to the light emitting element 18, and the outlet 22b of the optical waveguide 22 is oriented to the light receiving element 20 with the rotatable disk 16 interposed therebetween. The hatched portion in the drawings represent light passing between the respective members.

The light emitted from the light emitting element 18 enters the optical waveguide 22 from the inlet 22a. According to one embodiment, the optical waveguide 22 may have the internal structure having a mirror face. In this case, the incident light from the inlet 22a travels within the optical waveguide 22, while being repeatedly subject to mirror reflection, and therefore, highly collimated light exits at the outlet 22b.

The outgoing light from the outlet 22b of the optical waveguide 22 is oriented to a certain portion of the rotatable disk 16. The light partially passes through the rotatable disk 16 via the slits formed therein. The light projected onto a portion where no slit is formed is blocked by the rotatable disk 16. In this way, a pattern of light and shadow is generated. The pattern of light and shadow is detected by the light receiving element 20.

The light receiving element 20 may be a known light receiving element, such as a photodiode or phototransistor. The light receiving element 20 is used in order to detect a condition of rotational movement of the rotatable element (e.g., the electric motor) by detecting the pattern of light and shadow generated by the rotatable disk 16. Specifically, when the rotatable element is rotated, the rotatable disk 16 is rotated as well, which results in changing the pattern of light and shadow generated by the rotatable disk 16. The light receiving element 20 outputs an electric signal in response to changes in the pattern of light and shadow. The electric signal output from the light receiving element 20 is converted by a processing device, which is not shown, into information representative of an angular position or rotational speed of the rotor, or the like. The light emitting element 18 and the light receiving element 20 may be collective elements, respectively, formed from a plurality of light emitting elements and light receiving elements arranged in the form of matrix.

According to this embodiment, the light emitting element 18 and the light receiving element 20 are arranged on the same side in relation to the rotatable disk 16. In the illustrated embodiment, the light emitting element 18 and the light receiving element 20 are situated on the opposite side of the first housing part 24 in relation to the rotatable disk 16. As illustrated, the light emitting element 18 and the light receiving element 20 are mounted on a common printed circuit board 30, and spaced apart from each other. This arrangement allows the light emitting element 18 and the light receiving element 20 to have a common lead, which is not shown, connecting the printed circuit board 30 to an external power source. Since the elements of the optical system have a common part, the optical system can be accommodated in a smaller space, allowing the encoder 10 to be miniaturized.

The optical waveguide 22 is provided in the housing 12 formed independently of rotational movement of the rotatable unit of the encoder, i.e., the rotational axis 14 and the rotatable disk 16. Thus, when the rotatable disk 16 is in rotational movement, the optical system including the light emitting element 18, the optical waveguide 22 and the light receiving element 20 remain still. In this way, the optical system according to this embodiment is substantially isolated from the mechanical oscillation, which may be generated due to the rotational movement of the rotatable unit. This prevents the encoder 10 from being impaired in detection accuracy as a result of oscillation generated by the external factor.

Other embodiments of the present invention will be described below. In the following explanation, matters which have already been described will be omitted as necessary. The same or like elements are designated with the same referential numerals.

Figure 2:
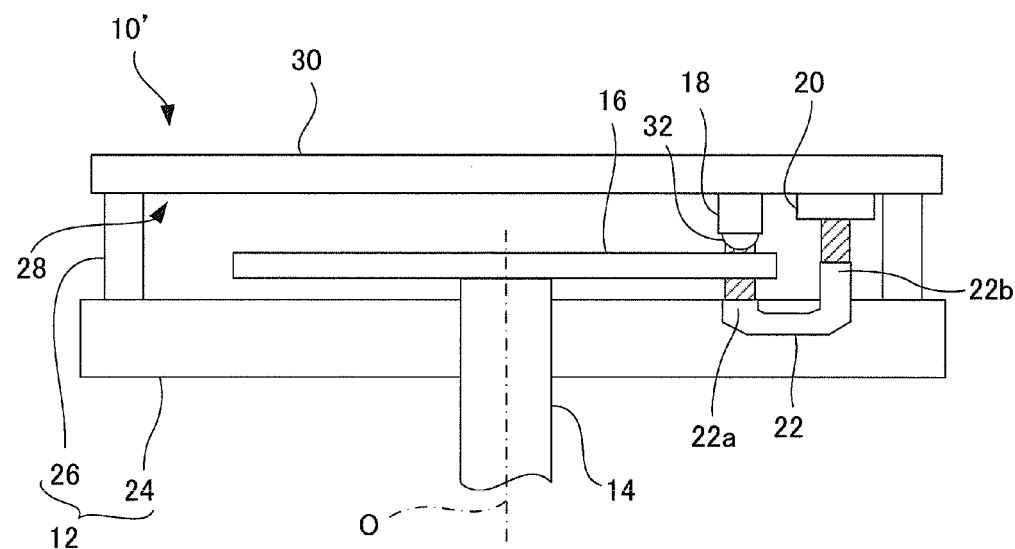
FIG. 2 shows an optical encoder according to a variant of the first embodiment of the present invention.

FIG. 2 shows a variant of the optical encoder 10 according to the first embodiment of the present invention. The encoder 10' according to this variant is configured such that the positions of the light emitting element 18 and the light receiving element 20 are interchanged. As a result, the inlet 22a and the outlet 22b of the optical waveguide 22 in the encoder 10' are interchanged. Specifically, the light emitting element 18 is mounted on the printed circuit board 30 so as to be oriented to a portion of the rotatable disk 16. The light receiving element 20 is mounted on the common printed circuit board 30 in a position distant from the light emitting element 18. The encoder 10' functions in the same way as the above-described encoder 10 according to the first embodiment, except that the light travels in the opposite direction, and enjoys the same advantage.

Figure 3:
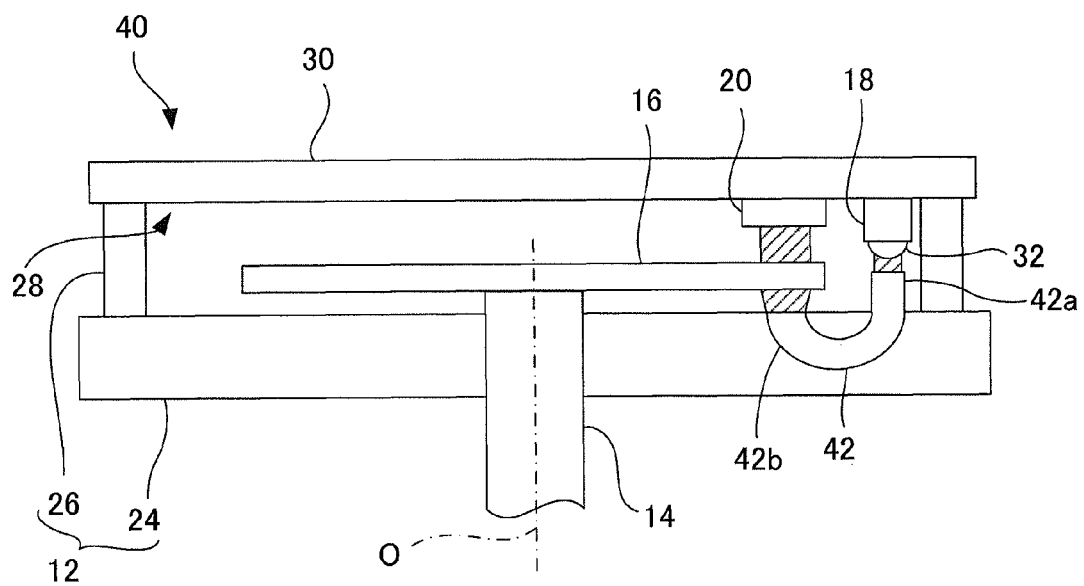
FIG. 3 shows an optical encoder according to a second embodiment of the present invention.

FIG. 3 shows an encoder 40 according to a second embodiment of the present invention. The encoder 40 of this embodiment is configured such that the optical waveguide 42 has an internal structure having a certain curvature so as to totally reflect the light entering through the inlet 42a. In this case, the incident light from the inlet 42a travels within the optical waveguide 42 while being repeatedly subject to total reflection. Therefore, the outgoing light from the outlet 42b is highly collimated.

Figure 4:
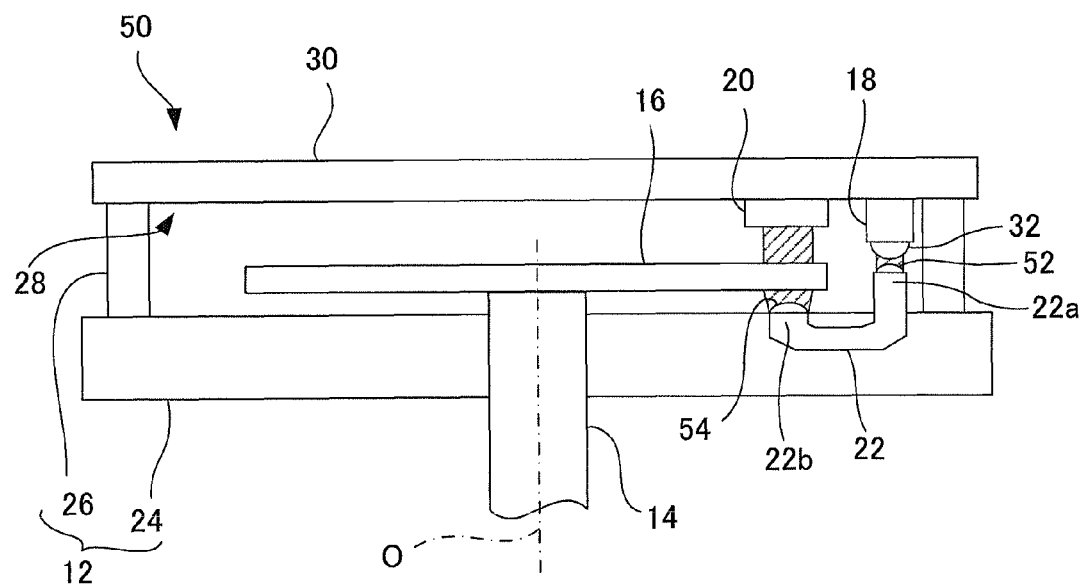
FIG. 4 shows an optical encoder according to a third embodiment of the present invention.

FIG. 4 shows an encoder 50 according to a third embodiment of the present invention. In the encoder 50 of this embodiment, lenses 52 and 54 are provided at the inlet 22a and the outlet 22b of the optical waveguide 22, respectively. The lenses 52 and 54 are optical elements designed to adjust the direction of light passing therethrough and generate parallel light. By the lenses 52 and 54 provided at the inlet 22a and the outlet 22b of the optical waveguide 22, the light passing through the lenses 52 and 54 becomes parallel light. Such a lens may be provided only at one of the inlet 22a and the outlet 22b of the optical waveguide 22.

Figure 5:
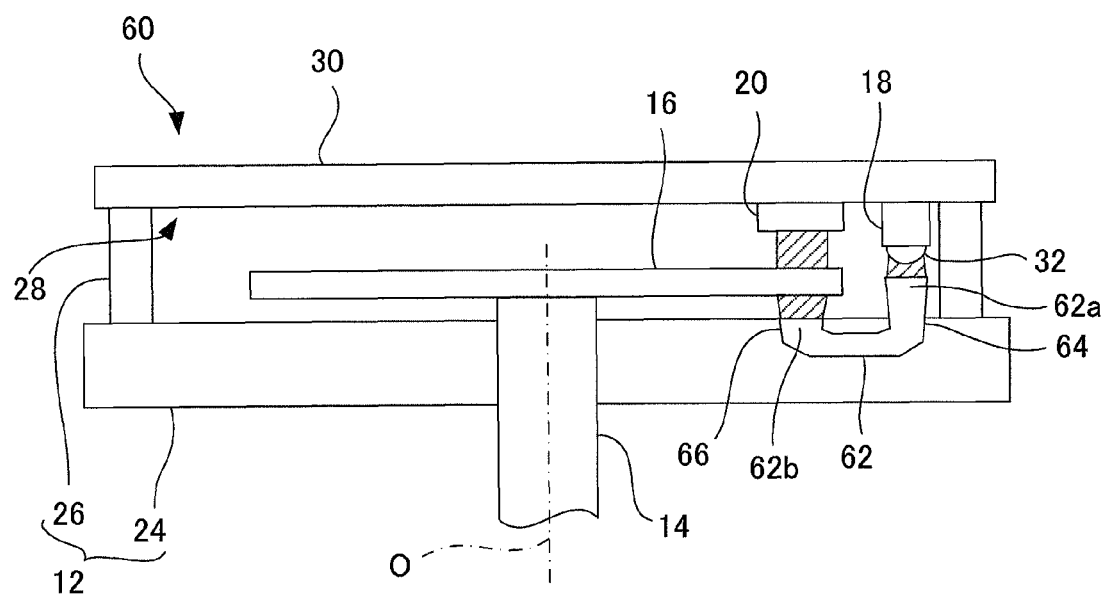
FIG. 5 shows an optical encoder according to a fourth embodiment of the present invention.

FIG. 5 shows an encoder 60 according to a fourth embodiment of the present invention. The encoder 60 of this embodiment is configured such that the optical waveguide 62 has enlarged portions 64 and 66 having a shape of trumpet at the inlet 62a and the outlet 62b, respectively, so as to increase the sectional area of the optical waveguide 62 (the sectional area taken along in a direction perpendicular to the optical axis). The enlarged portions 64 and 66 are designed to gradually increase the sectional area of the optical waveguide 62 from the inlet 62a toward the outlet 62b.

If the light emitted by the light emitting element 18 is not sufficiently collimated, the increasing amount of light leaks to the outside without entering the optical waveguide 62, as the gap between the light emitting element 18 and the optical waveguide 62 is widened. In contrast, the enlarged portion 64 at the inlet 62a of the optical waveguide 62 ensures that more light is led into the optical waveguide 62.

If the light receiving element 20 has an active area larger than a width of the outgoing light from the optical waveguide 62, the receiving element 20 may not perform a light receiving function over a sufficiently wide portion of its active area. In contrast, by forming the enlarged portion 66 at the outlet 62b of the optical waveguide 62, light can be projected onto a wider range over the light receiving element 20. Accordingly, the enlarged portions 64 and 66 can reduce light loss through the optical system. Such an enlarged portion may be provided only at one of the inlet 62a and the outlet 62b of the optical waveguide 62.

EFFECT OF THE INVENTION

According to the present invention, since the optical system of the encoder can be accommodated in a smaller space, the miniaturized encoder can be provided. Since the optical waveguide has a relatively simple configuration, an inexpensive encoder can be provided. By forming the optical waveguide independently of the rotational unit of the encoder, the encoder can be prevented from being impaired in detection accuracy due to the external factor.

Although various embodiments and modifications of the present invention have been described, it is apparent for those skilled in the art that other embodiments and modifications can also realize the intended effects and advantages of the invention. In particular, it is possible to omit or replace the constituent elements of the embodiments and modifications described herein, or add a known means thereto, without departing from the scope of the invention. It is also apparent for those skilled in the art that the invention can be implemented by any combination of the features of the embodiments explicitly or implicitly disclosed herein.

For example, although the modified example in which the positions of the light emitting element 18 and the light receiving element 20 are interchanged has been described with reference to FIG. 2, such modification may be applied to other embodiments. The lenses 52 and 54 described with reference to FIG. 4 may be used together with the enlarged portions 64 and 66 shown in FIG. 5.

What is claimed is:

1. A transmissive optical encoder comprising:
   a light emitting element;
   a light receiving element;
   a rotatable disk provided with slits and rotatable together with an object of detection; and
   an optical waveguide having an inlet facing the light emitting element and an outlet facing the light receiving element,
   wherein the light emitting element and the light receiving element are arranged on the same side in relation to the rotatable disk, and
   wherein the optical waveguide is fixed independently of rotational movement of the rotatable disk, and
   wherein the optical waveguide has an enlarged portion arranged at the inlet and/or the outlet thereof, such that sectional area of the optical waveguide gradually increases at the enlarged portion.

* * * * *